US006950667B2

United States Patent
Roy et al.

(10) Patent No.: US 6,950,667 B2
(45) Date of Patent: Sep. 27, 2005

(54) SYSTEM AND METHOD USING ADAPTIVE ANTENNAS TO SELECTIVELY REUSE COMMON PHYSICAL CHANNEL TIMESLOTS FOR DEDICATED CHANNELS

(75) Inventors: Vincent Roy, Montreal (CA); Paul Marinier, Brossard (CA)

(73) Assignee: Inter Digital Technology Corporation, Wilmington, DE (US)

( * ) Notice: Subject to any disclaimer, the term of this patent is extended or adjusted under 35 U.S.C. 154(b) by 25 days.

(21) Appl. No.: 10/686,327

(22) Filed: Oct. 14, 2003

(65) Prior Publication Data

US 2004/0156343 A1 Aug. 12, 2004

Related U.S. Application Data

(60) Provisional application No. 60/446,703, filed on Feb. 11, 2003.

(51) Int. Cl.[7] .............................. H04B 7/00; H04Q 7/20
(52) U.S. Cl. ........................ 455/511; 455/515; 455/517; 370/329; 370/341; 375/295
(58) Field of Search .................................. 455/511, 515, 455/517; 370/329, 341, 327; 375/295

(56) References Cited

U.S. PATENT DOCUMENTS

| | | | | |
|---|---|---|---|---|
| 4,870,408 A | * | 9/1989 | Zdunek et al. ............. 370/341 |
| 5,235,598 A | * | 8/1993 | Sasuta ........................ 370/327 |
| 5,239,678 A | * | 8/1993 | Grube et al. ................ 455/511 |
| 5,799,251 A | * | 8/1998 | Paavonen .................... 455/517 |
| 6,198,936 B1 | * | 3/2001 | Yang et al. .................. 455/515 |
| 6,240,298 B1 | * | 5/2001 | Hayata ........................ 455/511 |
| 6,272,352 B1 | * | 8/2001 | Cerwall et al. ............. 455/511 |
| 6,298,095 B1 | * | 10/2001 | Kronestedt et al. ......... 375/295 |
| 6,795,412 B1 | * | 9/2004 | Lee ............................. 370/329 |

\* cited by examiner

*Primary Examiner*—Stephen M D'Agosta
(74) *Attorney, Agent, or Firm*—Volpe and Koenig, P.C.

(57) ABSTRACT

A method and communication system (e.g., TDD system) that uses adaptive antennas at the base stations to monitor metrics associated with the quality of one or more CPCH timeslots, so as to determine whether to reuse some or all of the CPCH timeslots to transmit the DPCH. If it is determined to reuse some or all of the CPCH timeslots, an additional determination is made as to what limit to apply on the DPCH transmission powers. Adaptive antennas may be used at the base stations to allow the system to reuse some or all of the CPCH timeslots to transmit DPCH, thus improving the overall capacity of the system while maintaining the CPCH coverage and quality at a desired level throughout the system.

14 Claims, 4 Drawing Sheets

SYSTEM AND METHOD USING ADAPTIVE ANTENNAS TO SELECTIVELY REUSE COMMON PHYSICAL CHANNEL TIMESLOTS FOR DEDICATED CHANNELS

CROSS REFERENCE TO RELATED APPLICATION

This application claims priority from U.S. Provisional Patent Application Ser. No. 60/446,703, filed Feb. 11, 2003.

FIELD OF THE INVENTION

The present invention relates to wireless digital communication systems. More particularly, the present invention relates to a self-configuring time-division duplex (TDD) system which allows selective reuse of certain Common Physical Channel (CPCH) timeslots for dedicated channels.

BACKGROUND

Conventional cellular systems typically use a Broadcast Channel (BCH) to communicate information to a mobile user specific to the Radio Access Network (RAN) as well as to a given cell, even before a connection is established. In a TDD system, the BCH is transmitted on the Primary Common Control Physical Channel (PCCPCH). Another example of common channels transmitted on CPCH timeslots is the Forward Access Channel (FACH) which, in TDD, is transmitted on the Secondary Common Control Physical Channel (SCCPCH). As disclosed herein, the term "CPCH timeslot" refers to any timeslot that is used to transmit the CPCH.

Certain reserved timeslots are typically used throughout a subsystem of the TDD system to transmit the CPCH. The subsystem is an ensemble of TDD cells that can interfere with each other because of their relative close proximity, from a path loss point of view, to one another. For example, a subsystem could consist of one floor of a building deployed using multiple cells if the walls of the building would not provide sufficient isolation (from a path loss point of view) to prevent interference from one cell to another. Similarly, an entire building could be considered a subsystem if the floors and ceilings of the building would not provide sufficient isolation (from a path loss point of view) to prevent interference between floors. In an outdoor deployment, a subsystem can be anything from a small district consisting of a few cells to a large metropolitan area.

Depending on the performance of the receivers of the TDD system as well as the radio frequency (RF) isolation between cells, the TDD system may limit the number of timeslots required to transmit the CPCH to one CPCH timeslot. Alternatively, the TDD system may have to use more than one timeslot to ensure good quality on the CPCH (e.g., BCH reception if it is the PCCPCH, FACH block error rate (BLER) if it is the SCCPCH, etc.).

FIG. 1 illustrates the case when more than one timeslot is used in a conventional wireless communication system. Each base station (BS) A–F of the system would use only one of the timeslots 1, 2, 3 for its own CPCH transmission while refraining from transmitting anything on the other timeslots that the system uses for CPCH. Neighboring base stations would use the other timeslots for their CPCH transmissions. A given CPCH timeslot would be used only by base stations that are a certain distance apart from each other, thus enhancing the signal-to-interference ratio (SIR) of the CPCH for the mobile units served by these base stations and ensure contiguous coverage of CPCH. However, this diminishes the system capacity since less time timeslots are available for traffic in Dedicated Physical Channels (DPCHs).

There exists a need for a method and system which selectively reuses some of the CPCH timeslots in a TDD system for transmitting user data.

SUMMARY

The present invention uses adaptive antennas at the base stations of a communication system to monitor metrics associated with the quality of one or more CPCH timeslots to determine whether to reuse some or all of the CPCH timeslots to transmit the DPCH. If it is determined to reuse some or all of the CPCH timeslots, an additional determination is made as to what limit to apply on the DPCH transmission powers. Adaptive antennas may be used at the base stations to allow the system to reuse some or all of the CPCH timeslots to transmit DPCH, thus improving the overall capacity of the system while maintaining the CPCH coverage and quality at a desired level throughout the system.

BRIEF DESCRIPTION OF THE DRAWINGS

The objectives of the present invention will become apparent upon consideration of the accompanying detailed description and figures, in which.

DETAILED DESCRIPTION OF THE PREFERRED EMBODIMENTS

Figure 1:
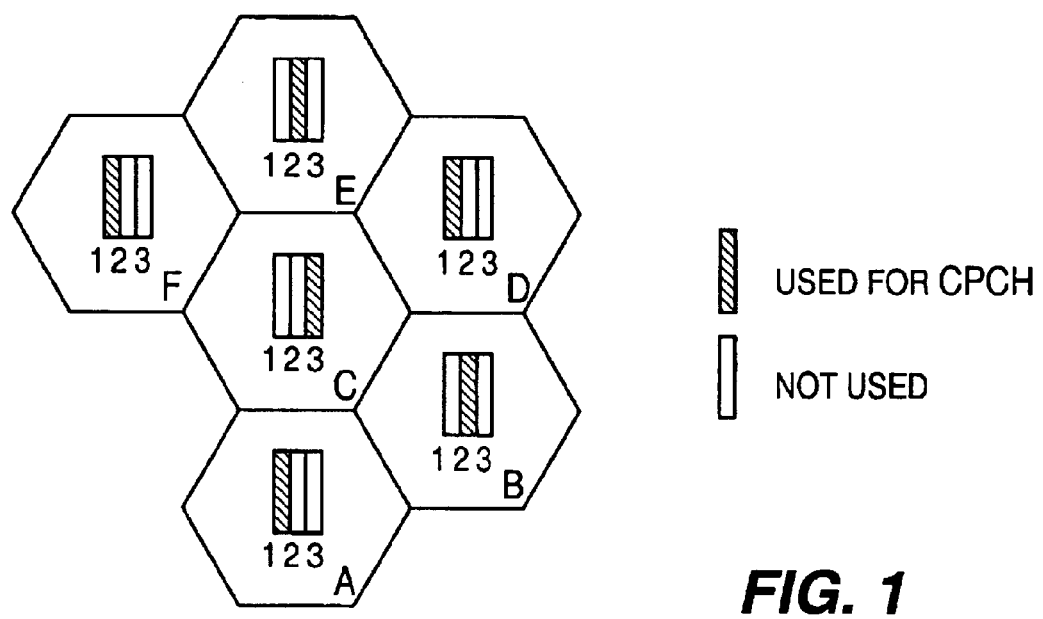
FIG. 1 illustrates the allocation of CPCH timeslots in the cells of a conventional wireless communication system.

Presently preferred embodiments are described below with reference to the drawing figures wherein like numerals represent like elements throughout.

While the description that follows is specifically explained as applicable to TDD and time division synchronous code-division multiple access (TD-SCDMA), it is to be noted that the invention in its broad form is also applicable to other systems of transmission, without limitation.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Figure 2:
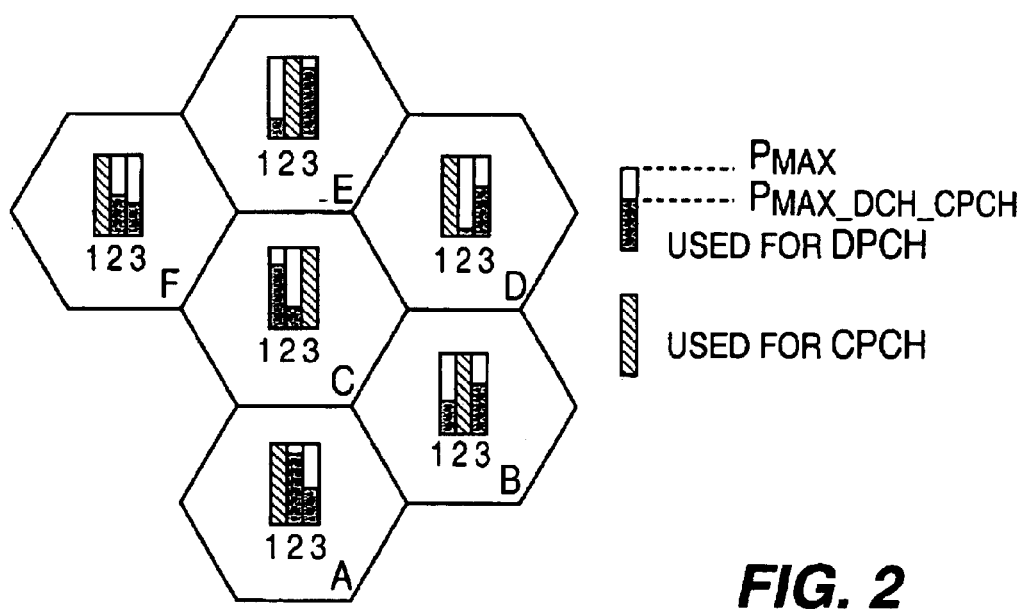
FIG. 2 illustrates the allocation of CPCH timeslots in the cells of a wireless communication system operating in accordance with the present invention.

Described hereinafter is an exemplary embodiment of a method and system which show how adaptive antennas in a communication system can be used at the base stations to allow the system to reuse at least some of the CPCH timeslots to transmit DPCH, as shown in FIG. 2, thus improving the overall capacity of the system while maintaining the CPCH coverage and quality at a desired level throughout the system. However, caution must be taken to avoid carelessly reusing the CPCH timeslots to transmit DPCH signals in the same subsystem, which could lead to CPCH signals with high interference and thus cause CPCH reception problems for mobile users in some regions. Some consequences resulting from poor CPCH reception include unacceptable delays for users to access the RAN, degradation of key radio resource management functions (e.g., such as handoffs and power control) and service holes for the CPCH. It is noted that even though the described example refers to a TDD system, the inventive method and system are equally applicable to other systems of transmission, such as TDS CDMA.

Figure 3:
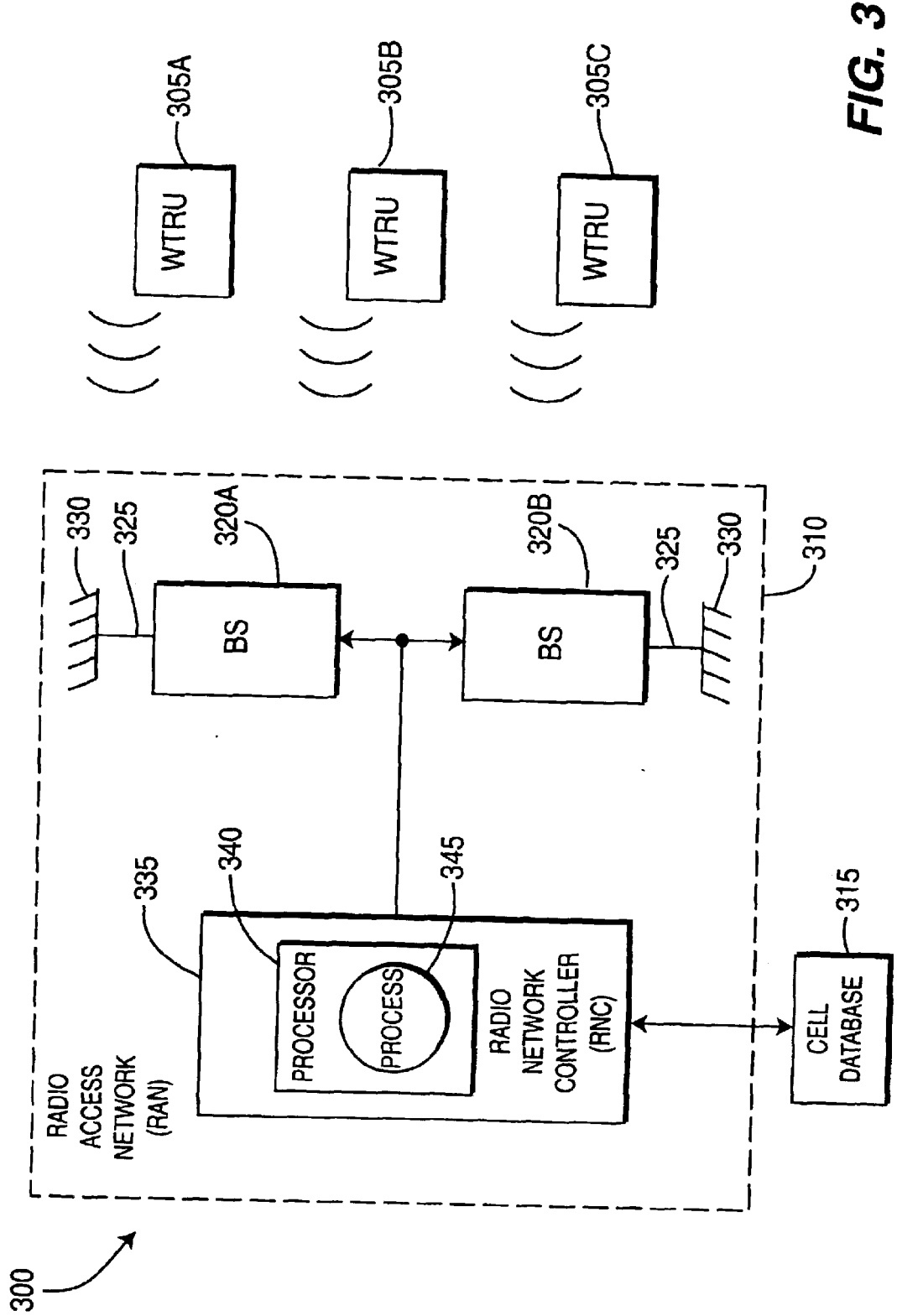
FIG. 3 is an exemplary block diagram of a communication system operating in accordance with a preferred embodiment of the present invention.

FIG. 3 shows an exemplary communication system 300 operating in accordance with the present invention. The communication system 300 includes a plurality of WTRUs 305A, 305B, 305C, a Radio Access Network (RAN) 310 and a cell database 315. The RAN 310 includes a plurality of base stations 320A, 320B equipped with adaptive antennas 325 consisting of $N_{ae}$ antenna elements 330. The RAN 310 further includes a radio network controller (RNC) 335 comprising a processor 340 on which a channel allocation process 345 runs. In the context of the present invention dealing with CPCH signals, the adaptive antennas 325 are used to identify the direction of arrival of the users sending the measurements. The RAN 310 is used to collect metrics measuring the quality on the CPCH for a large number of mobile locations as well as the received power measured by the WTRUs 305A, 305B, 305C that would provide insights on the path loss associated to the measured CPCH quality metrics.

Examples of CPCH quality metrics that may be collected by the system include, but are not limited to, BCH reading time statistics and measured SIR on the PCCPCH timeslot(s) in the case of PCCPCH or FACH BLER, and measured SIR on the SCCPCH timeslot(s) in the case of SCCPCH. It is assumed that a poor CPCH quality metric is caused by either the CPCH signal being too low compared to thermal noise or the CPCH signal being damped in interference.

To qualify as a valid CPCH quality metric, the power of the CPCH signal measured at the WTRU must be high enough compared to thermal noise so that the WTRU is considered to be within the coverage area of the CPCH. In that regard, statistics from WTRUs that experience poor CPCH reception because they are too far (or shadowed) from the serving base station should not be included in the analysis described below. To that effect, the CPCH quality measurement for which the received measured power is lower than a certain threshold should be dismissed.

For each CPCH quality metric it collects, the communication system 300 measures the signals received at each antenna element 330 of the base stations 320A, 320B. This measurement is used by the communication system 300 to identify, with its antenna array, the direction of arrival of the WTRU sending the CPCH quality metric.

Figure 4:
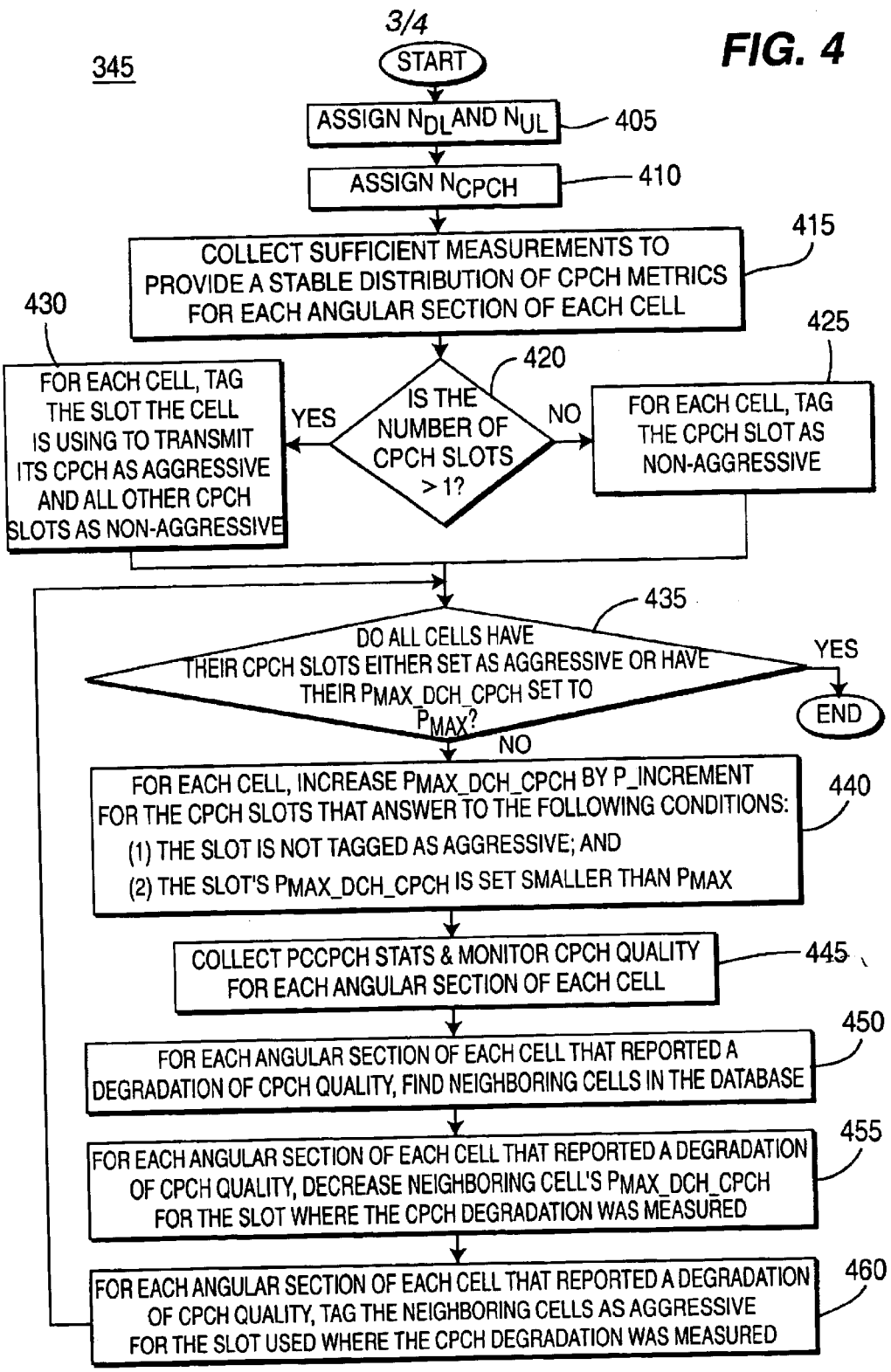
FIG. 4 is a flow chart illustrating method steps for selectively reusing CPCH timeslots for transmitting user data in the communication system of FIG. 3.

The channel allocation process 345 running on a processor 340 allows the base stations 320A, 320B to reuse some or all of the CPCH timeslots to transmit DPCH signals. Referring to FIG. 4, process 345 used by the communication system 300 allows dedicated channels in CPCH timeslots. The communication system 300 is configured such that more than one CPCH timeslot ($N_{CPCH}$>1) may be used. In an initial state of the communication system 300, $N_{dl}$ downlink timeslots and $N_{ul}$ uplink timeslots are assigned (step 405) where $N_{dl}+N_{ul}$ is the total number of timeslots per TDD frame. The communication system 300 is also assumed, for example, to use a total of $N_{CPCH}$ different timeslots to transmit the CPCH signals, where $N_{CPCH}$ is assigned a value from one to $N_{dl}$ (step 410). At this point, none of the CPCH timeslots is used to transmit DPCH signals.

Referring still to FIG. 4, before attempting to reuse the CPCH timeslots to transmit DPCH signals, the communication system 300 must collect enough measurements to provide a relatively stable distribution of CPCH quality metrics for each angular section of each cell (step 415). Once the communication system 300 is perceived as having adequate CPCH reception and having a stable distribution of CPCH metrics, the communication system 300 will start a process in which it will attempt to reuse the CPCH timeslots of a base station in the system to support DPCH traffic. In the initial state, an operator using a single CPCH timeslot in its whole system, as indicated by the "NO" output of step 420, would tag the CPCH timeslot of each cell as non-aggressive (step 425). An operator using more than one CPCH timeslot as indicated by the "YES" output of step 420 would tag the CPCH timeslot of each cell as aggressive and tag all other $N_{CPCH}-1$ CPCH timeslots as non-aggressive (step 430).

Aggressive and non-aggressive identifiers are simple binary flags which provide the capability to remove one or multiple CPCH timeslots of a cell from the process described above once it is believed that the cell should no longer increase the power of DPCH signals in that timeslot. The term "aggressive" refers to interfering. If increasing $P_{max\_dch\_CPCH}$ for a given timeslot in a first cell, results in a second cell's CPCH reception being degraded, the first cell is considered to be aggressive during that timeslot.

For each cell that is tagged as a "non-aggressive" for a given timeslot, $P_{max\_dch\_CPCH}$ is increased by $P\_{increment}$ Watts unless $P_{max\_dch\_CPCH}$ already corresponds to the maximum power ($P_{max}$) that the base station is allowed to transmit in a timeslot. $P_{max\_dch\_CPCH}$ is the maximum transmit power a base station is allowed to use to transmit a DPCH signal in a CPCH timeslot. P_increment is the step size used by the process to iteratively increase $P_{max\_dch\_CPCH}$, and $P_{max}$ is the maximum power a base station is allowed to transmit independently of the nature of the signals (i.e., CPCH or DPCH).

In step 435, a determination is made as to whether (1) all of the cells have their CPCH timeslots set as aggressive or (2) have their $P_{max\_dch\_CPCH}$ set to Pmax. If none of the conditions (1) or (2) exists, in step 440 $P_{max\_dch\_CPCH}$ is increased for each cell by P_increment for the CPCH timeslots that (i) are not tagged as aggressive and (ii) have a Pmax_dch_CPCH that is set smaller than Pmax. In step 445, PCCPCH statistics are collected and CPCH quality is monitored for each angular section of each cell. For each angular section of each cell that reported a degradation of CPCH quality, neighboring cells are found in the cell database 315 (step 450). In step 455, the neighboring cells identified in step 450 have their Pmax_dch_CPCH decreased by P_increment for the timeslot where the CPCH degradation was measured. In step 460, the neighboring cells identified in step 450 are tagged as aggressive for the timeslot used where the CPCH degradation was measured.

Thus, for each angular section of every cell, a decision is made as to whether or not the added interference from the DPCH signals is detrimental to the CPCH quality of the timeslots. This decision is initiated only when a cell has collected enough CPCH quality measurements to achieve a certain level of confidence on the statistical relevance of the new measurements. If unsatisfactory CPCH quality is detected in one or several elements, each of the element's neighbors will be tagged as an aggressive cell. The $P_{max\_dch\_CPCH}$ parameter of each aggressive cell is then lowered by $P\_{increment}$ Watts. There is no minimum power and P_increment is a variable that can be set to any value. The process continues until all cells are tagged as aggressive or until all cells have their Pmax_dch_CPCH set to the Pmax.

The following two actions or a combination of the two can be performed to determine if the added interference is detrimental to the CPCH quality:

(1) Compare the newly acquired CPCH distributions against the "baseline" distribution. Each angular section has a distribution. For example, if an adaptive antenna has ten antenna elements to allow the definition of ten angular sections, 10 distributions for that base station should be stored. This should be done for each $N_{ae}$ angular section of the cell. The comparison of one distribution with another could be done in various ways including, but not limited to, the comparison of statistics extracted from the two distributions (e.g., mean, median, 5% of the Cumulative Distribution Function, etc.).

(2) Verify whether the newly acquired CPCH distribution is worse than what is considered an acceptable CPCH quality distribution. This criterion differs from the above criterion in the sense that even in the case where the use of the CPCH timeslot to transmit DPCH signals would degrade the CPCH quality compared to the baseline, this added degradation might be considered acceptable if the CPCH quality is still maintained above a certain desired level.

The cell database 315 is used to identify the neighboring cells (from a radio frequency (RF) point of view) of any given base station. One example of such database includes the database used by cellular operators with their RF planning tools. The cell database 315 is also used to associate each antenna element 330 of each base station 320A, 320B, and its associated angle, to one or more neighboring cells. The channel allocation process 345 running on a processor 340 allows the base stations 320A, 320B to reuse some or all of the CPCH timeslots to transmit DPCH signals.

With adaptive antennas constituted of $N_{ae}$ antenna elements, it is possible to identify the direction of arrival of an incoming signal with an angular resolution of $(\Theta_s/N_{ae})$ where $(\Theta_s)$ is the angle covered by the main lobe of a single antenna element. The angle $(\Theta_s)$ corresponds to the angle spanned by a cell when the adaptive antenna is used in a cellular context. For example, for a sector in a tri-sectorized deployment this angle is 120 degrees and for an omni-directional cell this angle is 360 degrees. Thus, if the cell is divided in $N_{ae}$ angular sections (that span equal angles), the adaptive antenna allows the determination of which angular section the incoming signal is originating from. From the collection of these measurements for a large number of users, the communication system 300 is able to obtain a distribution of CPCH quality metrics for each $N_{ae}$ angular section of the cell. A distribution of the CPCH quality could take the form of a histogram in which each bin would correspond to a small interval of the CPCH quality metric.

Figure 5:
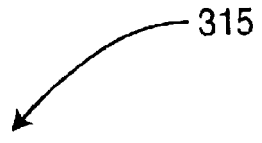
FIG. 5 illustrates the configuration of an exemplary cell database used in accordance with the present invention.

FIG. 5 shows an exemplary configuration of cell database 315 where C1 . . . CN are cell identifiers and $\Theta_{i-1}$ to $\Theta_i$ specify a range as to the angle from which the interference problem is perceived. Note that the status of whether a cell is tagged aggressive or non-aggressive is not necessarily in the database, but may be in the process itself. For example, once it is know that Cell 2 has interference in a certain region (as determined by the angle of arrival provided by the adaptive antennas), the database determines which interfering cell causes this interference.

The present invention may be implemented in conjunction with a Fast Dynamic Channel Allocation (FDCA) algorithm which is responsible for assigning DPCH signals to timeslots, but is only allowed to transmit DPCH signals at a certain transmission power with $P_{max\_dch\_CPCH}=0$ Watts (no transmission) on the CPCH timeslot(s). Initially, the FDCA algorithm does not allow the DPCH to be transmitted on the CPCH timeslots, as indicated by a separate flag or, more simply, by reusing the variable $P_{max\_dch\_CPCH}$ but setting it to zero. The FDCA algorithm is the process by which the RAN allocates channels to mobile users. Typically, the FDCA algorithm receives, for each cell, a list of timeslots it is allowed to use to serve DPCH signals. In conventional systems, the FDCA would receive a list of timeslots that would not include CPCH timeslots. In the context of the present invention, the FDCA receives, for each cell, a list of timeslots including one or more CPCH timeslots. In order to control the level at which the CPCH timeslots are reused to transmit DPCH signals, the FDCA will also receive along with each CPCH timeslot for each cell, the parameter $P_{max\_dch\_CPCH}$ which explicitly limits the power a certain base station is allowed to use to transmit a DPCH signal during a given CPCH timeslot.

In one embodiment of the present invention, the system stores each distribution of CPCH quality metric using a histogram where each bin of the histogram would correspond to a range of the CPCH quality metric. For example, if the CPCH quality metric was BCH reading time, the histogram could have bins corresponding to a one second duration, i.e. the first bin of the histogram would be used to store measurements reporting a BCH reading time between 0 and 1 second, the second bin would be used to store measurements reporting BCH reading time between 1 and 2 seconds, etc. Every time a WRTU sends a CPCH quality metric measurement report to a base station, the system identifies the angular section where that WTRU is located and associates the CPCH quality metric to that angular section by storing it to the appropriate bin of the histogram associated to the angular section.

After a large number of measurements have been collected, the distribution is considered to be stable. The exact number of measurements required to obtain a stable distribution depends on the number of bins in the histogram and their capacity. The communication system 300 must also be configured in such a way that CPCH reception is adequate. Adequate reception is a general term which can be implemented in many ways. For example, one could decide that adequate reception means that no more than 10% of the CPCH quality measurements are below a certain desired target, (e.g., three seconds if the CPCH quality metric is BCH reading time). Each of these stable distributions will be referred as a "baseline" distribution.

In conventional cellular systems, wireless operators have a database which contains the different sectors or cells of their systems and identifies, for each, the list of neighboring sectors. What determines if sector A is a neighbor of sector B is the amount of power sector B would receive from sector A if a base station at sector A transmits at its maximum power. Software propagation prediction tools and/or drive-tests measurements are used to fill these databases. The cell database 315 goes one step further in identifying the neighboring cell(s) of each angular section rather than of each sector. Once again, this can be achieved using software propagation prediction tools.

As to the frequency of execution, the process 345 may be re-executed for a sub-system (or the whole system) after a change in the system configuration (e.g. addition of cells, antenna tilt modification, etc.). Re-executing the process 345 consists of resetting $P_{max\_dch\_CPCH}$ to zero Watts for all CPCH timeslots, re-building baseline distributions, and performing the steps outlined above.

The present invention as described above reuses the CPCH timeslots in a communication system (e.g., TDD system) to transmit user data, thus improving the overall capacity of the system. This is especially important in scenarios where the propagation conditions will force the operator to use multiple CPCH timeslots to guarantee an acceptable level of CPCH quality, a situation that could prove to be common when contiguous coverage is desired. Significantly, the invention requires very little intervention from the operator and provides an efficient resource utilization of the CPCH timeslots.

While the present invention has been described in terms of the preferred embodiment, other variations which are within the scope of the invention as outlined in the claims below will be apparent to those skilled in the art.

What is claimed is:

1. In a wireless communication system, a method of reusing common physical channel (CPCH) timeslots to transmit dedicated physical channel (DPCH) signals, the method comprising:

(a) tagging each CPCH timeslot as being aggressive or non-aggressive;

(b) limiting the power level for transmitting DPCH signals over the CPCH timeslots to a maximum power level;

(c) if the number of CPCH timeslots is not greater than one, tagging the CPCH timeslots as being non-aggressive;

(d) if the number of CPCH timeslots is greater than one, tagging for each cell the CPCH timeslots to be reused to transmit DPCH signals as being aggressive, and tagging all others of the CPCH timeslots as being non-aggressive;

(e) increasing by a predetermined amount the power of a DPCH signal transmitted for each CPCH timeslot that is tagged as being non-aggressive and the power is below a predetermined maximum power level;

(f) monitoring the metrics associated with the quality of the CPCH timeslot; and (g) for each angular section of each cell associated with a degradation of CPCH quality, determining the respective neighboring cells, reducing the maximum power level for the CPCH timeslots in the neighboring cells associated with the degradation of CPCH quality, and tagging the neighboring cells as being aggressive for the CPCH timeslots associated with the degradation of CPCH quality.

2. The method of claim 1 further comprising:

(h) assigning a predetermined number of downlink timeslots;

(i) assigning a predetermined number of uplink timeslots; and (j) assigning a predetermined number of CPCH timeslots.

3. The method of claim 2 wherein the number of CPCH timeslots is between one and the number of downlink timeslots.

4. The method of claim 1 wherein the communication system is a time-division duplex (TDD) system and the cells are TDD cells.

5. In a wireless communication system, a method of reusing the common physical channel (CPCH) timeslots to transmit dedicated physical channel (DPCH) signals at a power level that does not exceed a maximum power level, the system including (i) a plurality of cells, each cell having a plurality of angular sections; (ii) a plurality of wireless transmit/receive units (WTRUs); (iii) a radio access network (RAN) for collecting metrics associated with the quality of the CPCH timeslots and received power measured by said WTRUs; (iv) a plurality of base stations which transmit CPCH signals over a plurality of timeslots, said base stations having adaptive antennas operating in respective ones of said cells, each base station being in communication with respective ones of said WTRUs; and (v) a database which associates the cells with the adaptive antennas of the base stations, the method comprising:

(a) the RAN determining that the communication system has a stable distribution of CPCH metrics for each angular section of each cell;

(b) tagging, in the database, each CPCH timeslot as being aggressive or non-aggressive;

(c) increasing by a predetermined amount the power of a DPCH signal transmitted by the base station in each CPCH timeslot that is tagged as being non-aggressive and the power is below a predetermined maximum power level;

(d) monitoring the metrics associated with the quality of the CPCH timeslot; and (e) for each angular section of each cell associated with a degradation of CPCH quality, determining the respective neighboring cells, reducing the maximum power level for the CPCH timeslots in the neighboring cells associated with the degradation of CPCH quality, and tagging, in the database, the neighboring cells as being aggressive for the CPCH timeslots associated with the degradation of CPCH quality.

6. The method of claim 5 further comprising:

(f) assigning a predetermined number of downlink timeslots;

(g) assigning a predetermined number of uplink timeslots; and (h) assigning a predetermined number of CPCH timeslots.

7. The method of claim 6 wherein the number of CPCH time slots is between one and the number of downlink timeslots.

8. The method of claim 5 further comprising repeating steps (c)–(e) until all of the CPCH slots are tagged in the database as being aggressive or are designated to transmit DPCH signals at the maximum power level.

9. The method of claim 5 wherein the communication system is a time-division duplex (TDD) system and the cells are TDD cells.

10. A wireless communication system which reserves common physical channel (CPCH) timeslots, the system comprising:

(a) plurality of wireless transmit/receive units (WTRUs);

(b) a radio access network (RAN) for collecting metrics associated with the quality of the CPCH timeslots and received power measured by the WTRUs;

(c) a database in which each CPCH timeslot is tagged as being aggressive or non-aggressive;

(d) a plurality of cells, each cell having a plurality of angular sections;

(e) a plurality of base stations which transmit CPCH signals over a plurality of timeslots, said base stations having adaptive antennas operating in respective ones of said cells, each base station being in communication with respective ones of said WTRUs;

(f) a processor in communication with the RAN, the database, the base stations and the WTRUs; and (g) a process running on the processor for monitoring the metrics associated with the quality of the CPCH timeslot, wherein for each angular section of each cell associated with a degradation of CPCH quality, the respective neighboring cells are determined, the maximum power level for the CPCH timeslots in the neighboring cells associated with the degradation of CPCH quality is reduced, and in the database, the CPCH timeslots in the neighboring cells associated with the degradation of CPCH quality are tagged as being aggressive.

11. The system of claim 10 wherein the CPCH timeslots are reserved to transmit broadcast channel (BCH) signals.

12. The system of claim 10 wherein the CPCH timeslots are reused to transmit dedicated physical channel (DPCH) signals at a power level that does not exceed a maximum power level.

13. A wireless communication system for reusing common physical channel (CPCH) timeslots to transmit dedicated physical channel (DPCH) signals, the system comprising:

(a) means for tagging each CPCH timeslot as being aggressive or non-aggressive;

(b) means for limiting the power level for transmitting DPCH signals over the CPCH timeslots to a maximum power level;

(c) means for tagging the CPCH timeslots as being non-aggressive if the number of CPCH timeslots is not greater than one;

(d) means for tagging for each cell the CPCH timeslots to be reused to transmit DPCH signals as being aggressive if the number of CPCH timeslots is greater than one, and tagging all others of the CPCH timeslots as being non-aggressive;

(e) means for increasing by a predetermined amount the power of a DPCH signal transmitted for each CPCH timeslot that is tagged as being non-aggressive and the power is below a predetermined maximum power level;

(f) means for monitoring the metrics associated with the quality of the CPCH timeslot;

(g) means for determining the respective neighboring cells for each angular section of each cell associated with a degradation of CPCH quality; and (h) means for reducing the maximum power level for the CPCH timeslots in the neighboring cells associated with the degradation of CPCH quality; and (i) means for tagging the CPCH timeslots in the neighboring cells associated with the degradation of CPCH quality as being aggressive.

14. The system of claim 13 wherein the system is a time-division duplex (TDD) system and the cells are TDD cells.

* * * * *

UNITED STATES PATENT AND TRADEMARK OFFICE
CERTIFICATE OF CORRECTION

PATENT NO. : 6,950,667 B2
APPLICATION NO. : 10/686327
DATED : September 27, 2005
INVENTOR(S) : Roy et al.

It is certified that error appears in the above-identified patent and that said Letters Patent is hereby corrected as shown below:

At column 2, line 1, after the word "less", delete "time".

At column 4, line 46 after the words "set to", delete "Pmax" and insert therefor --$P_{max}$--.

At column 4, lines 49-50, after the words "have a", delete "Pmax_dch_CPCH" and insert therefor --$P_{max\_dch\_CPCH}$--.

At column 4, line 50, after the word "than", delete "Pmax" and insert therefor --$P_{max}$--.

At column 4, line 56 after the word "their", delete 'Pmax_dch_CPCH" and insert therefor --$P_{max\_dch\_CPCH}$--.

At column 5, line 7, after the word "their", delete "Pmax_dch_CPCH set to the Pmax" and insert therefor --$P_{max\_dch\_CPCH}$ set to the $P_{max}$--.

At column 5, line 51, after the word "divided", delete "in" and insert therefor --into--.

Signed and Sealed this

Nineteenth Day of December, 2006

JON W. DUDAS
*Director of the United States Patent and Trademark Office*